United States Patent
De Temple (10) Patent No.: US 8,833,801 B2
(45) Date of Patent: Sep. 16, 2014

(54) COMPENSATOR FOR CONNECTING PIPES FOR DUST-LADEN FLUE GAS

(75) Inventor: Gunther De Temple, Mainhausen (DE)

(73) Assignee: Dekomte De Temple Kompensatortechnik GmbH, Seligenstadt (DE)

( * ) Notice: Subject to any disclaimer, the term of this patent is extended or adjusted under 35 U.S.C. 154(b) by 0 days.

(21) Appl. No.: 13/807,980

(22) PCT Filed: Jul. 1, 2011

(86) PCT No.: PCT/DE2011/001467
§ 371 (c)(1),
(2), (4) Date: Jan. 28, 2013

(87) PCT Pub. No.: WO2012/010156
PCT Pub. Date: Jan. 26, 2012

(65) Prior Publication Data
US 2013/0200612 A1    Aug. 8, 2013

(30) Foreign Application Priority Data
Jul. 3, 2010    (EP) .................................... 10006892

(51) Int. Cl.
*F16L 27/107* (2006.01)
*F16L 51/02* (2006.01)
*F23J 13/04* (2006.01)

(52) U.S. Cl.
CPC ................ *F16L 51/02* (2013.01); *F23J 13/04* (2013.01); *F16L 51/024* (2013.01); *F16L 51/022* (2013.01); *F16L 51/026* (2013.01); *F23J 2213/202* (2013.01)
USPC ............ 285/224; 285/223; 285/225; 285/236

(58) Field of Classification Search
USPC .................... 285/145.4–145.5, 223–226, 229, 285/235–236, 299–301
See application file for complete search history.

(56) References Cited

U.S. PATENT DOCUMENTS

| 2,712,456 A | * | 7/1955 | McCreery | ................... 285/145.5 |
| 2,958,550 A | * | 11/1960 | McDonald | .................... 285/301 |

(Continued)

FOREIGN PATENT DOCUMENTS

| DE | 1760997 U | 2/1958 |
| DE | 9402263 U1 | 7/1994 |

OTHER PUBLICATIONS

International Search Report (with English translation) for PCT Application No. PCT/DE2011/001467, dated Dec. 1, 2011, 6 pages.

(Continued)

*Primary Examiner* — Aaron Dunwoody
*Assistant Examiner* — Fannie Kee
(74) *Attorney, Agent, or Firm* — Westman, Champlin & Koehler, P.A.

(57) ABSTRACT

A compensator for connecting a first pipe connection piece to a second pipe connection piece that is arranged at a distance from the first pipe connection piece and that can be moved toward the first pipe connection piece includes an inlet pipe, which is fastened coaxially to the outlet opening of the first pipe connection piece, an outlet pipe, which is arranged approximately coaxially to the inlet pipe, is arranged at a distance from the inlet pipe and is fastened coaxially to the inlet opening of the second pipe connection piece, and a woven-fabric compensator, which connects the inlet pipe and the outlet pipe to each other, wherein gas laden with dust can flow through all aforementioned pipes, said gas being directed from the first pipe connection piece to the second pipe connection piece, and wherein a hollow cylindrical inlet guide plate is fastened to the inlet pipe near the first pipe connection piece, the radius of said inlet guide plate corresponding approximately to the inner radius of the first pipe connection piece.

16 Claims, 3 Drawing Sheets

(56) References Cited

U.S. PATENT DOCUMENTS

| | | | |
|---|---|---|---|
| 3,460,856 A | | 8/1969 | Tine et al. |
| 3,704,034 A | * | 11/1972 | Shire et al. ............... 285/47 |
| 3,874,711 A | | 4/1975 | Scalzo et al. |
| 3,997,194 A | * | 12/1976 | Eifer et al. ............... 285/53 |
| 4,299,414 A | | 11/1981 | Bachmann |
| 4,576,404 A | * | 3/1986 | Weber ............... 285/41 |
| 4,645,244 A | * | 2/1987 | Curtis ............... 285/114 |
| 4,668,303 A | * | 5/1987 | Weber ............... 134/22.13 |
| 5,011,194 A | * | 4/1991 | Nitta ............... 285/41 |
| 5,370,427 A | * | 12/1994 | Hoelle et al. ............... 285/301 |
| 5,383,316 A | | 1/1995 | Burke et al. |
| 6,027,147 A | * | 2/2000 | Elliott ............... 285/229 |
| 6,419,280 B2 | * | 7/2002 | Uegane et al. ............... 285/300 |
| 7,484,773 B2 | * | 2/2009 | Niccum ............... 285/226 |
| 2001/0008341 A1 | * | 7/2001 | Uegane et al. ............... 285/300 |

OTHER PUBLICATIONS

International Preliminary Report on Patentability including transmittal for PCT Application No. PCT/DE2011/001467, date of mailing Jan. 17, 2013, 6 pages.

* cited by examiner

COMPENSATOR FOR CONNECTING PIPES FOR DUST-LADEN FLUE GAS

CROSS-REFERENCE TO RELATED APPLICATION

This application is a Section 971 National Stage Application of International Application No. PCT/DE2011/001467, filed 1 Jul. 2011 and published as WC 2012/010156 A1 26 Jan. 2012, in German, the contents of which are hereby incorporated by reference in their entirety.

BACKGROUND

The invention relates to a compensator for connecting a first pipe socket to a second pipe socket that is spaced from the former and movable with respect thereto, comprising an inlet pipe which is coaxially fixed on the outlet opening of the first pipe socket and an outlet pipe which is arranged approximately coaxially to the inlet pipe and is spaced therefrom and is coaxially fixed on the inlet opening of the second pipe socket and a fabric compensator, which connects the inlet pipe and outlet pipe to one another, wherein all the aforementioned pipes allow dust-laden gas to flow through, in the direction from the first pipe socket to the second pipe socket.

In firing systems, such as thermal power station and waste incinerators, and all other applications in which hot gases are guided in pipes, the temperatures in each case of the pipes are very varied, depending on the particular operating state. As a result, thermally related displacements of the pipe in their longitudinal axes and transversely thereto occur.

An important exemplary embodiment is a large incineration system with a circulating fluidized bed system. In the circuit of the exhaust-gas return, the so-called cyclone downpipe runs from the cyclone to the trap, which discharges the returning ash. This return circuit cannot be constructed as a pipe system welded throughout, since it would then be cracked by the strongly different temperatures of the individual pipe regions in the different operating states and the different expansions effected thereby.

It is therefore necessary to divide up this circuit, it being necessary to produce a connection at the joining point but again between the two pipe sockets, which can compensate for the thermally related movements of the two pipe sockets.

In the prior art, pipe ends that are moveable somewhat with respect to one another are connected to one another by means of flexible fabric compensators, with are arranged in the manner of a bellows and consist of a textile material that can withstand the, under some conditions, very high operating conditions and at the same time is permanently flexible so that it compensates the movements of the two pipe sockets with respect to one another.

The German utility model document DE 1 760 997, Steinmüller, describes two flue-gas ducting pipe sockets, which are movable with respect to one another. In this case, only a movement in the axial direction of the two pipes is compensated. To this end the two pipe socket are plugged telescopically one inside the other along a short length. In the process, a narrow joint is produced between the two flue-gas pipes, which is covered by a multi-corrugated compensator. It is disadvantageous that only a movement of the pipes with respect to one another in an axial direction can be intercepted. A further, very considerable disadvantageous is that, in the case of a transition of the streaming from the narrow into the wider pipe, as well as in the reverse direction , the diameter changes suddenly, so that at this point turbulence in the flow develops, which leads to the deposition of solids, which can be entrained by the flowing gas.

In the prior art, German utility model GS DE 94 02 263, GFG, describes a fabric compensator that consist of multiple layers: Alternately with a layer of a "high-temperature insulation fabric", a stainless steel fabric or a stainless steel foil is incorporated. By this means, the fabric compensator is resistant to very high temperatures and nevertheless is moveable in the longitudinal direction as well as transversely to the fluegas stream. This fabric compensator is held by a metal ring in each case at its two ends and, by means of this ring, is fastened on the two gas-carrying pipe sockets.

The decisive disadvantage of this fabric compensation is that its layers are very thin, which leads to cooling within the compensator. A further problem is that the cross-section for streaming suddenly enlarges. If the two pipe sockets are very close together, the compensator even forms a pocket. If the flue gas carries entrained solids, such as ash, also termed an inert mass, this is very quickly deposited in the compensator, which is bulged out like a pocket. In addition, it is additionally cooled by the defective insulation in this area and thereby become lumpy and hardens.

In a typical application case, the ash components have a temperature of about 900 degrees Celsius, which is opposed by a wall thickness of the fabric compensator of less than 1 cm. By this means, a significant cooling is effected, which in the case of ash leads to caking, that is to say to sticking together of the individual ash components. In this manner, crust-like deposits occur within the compensator and, at its inlet and outlet area, can lead to damage of the compensator and blockage of the flue gas ducting in this area.

Since the compensator is generally part of a very large and very complicated system with very high operating costs, the failure costs in comparison to the investment sum for the compensator are in many cases extremely high.

Against this background, it is the object of the invention to develop a compensator that permits as far as possible laminar flow of the dust-laden gas within the compensator and which cools the flue gas as little as possible. As a solution, the invention teaches that a hollow cylindrical inlet guide plate is fastened close to the first pipe socket, the radius of which corresponds approximately to the internal radius of the first pipe socket.

The essential feature of the invention is thus that the inlet guide plate, which covers the greatest portion of the distance between the two pipe sockets and—to a first approximation— complements the inlet pipe and the outlet pipe inwardly to form a double-walled pipe. This double-walled pipe is only interrupted by the slit between the inlet pipe and outlet pipe, which, however, is outwardly covered by the flexible fabric compensator. Inwardly, the "double-walled pipe" is interrupted by the two joints between the inlet guide plate and the two pipe sockets. These two joints, however, are essential, since the two pipe sockets move with respect to one another due to different temperatures of the system components, specifically both in the longitudinal and transverse direction of the compensator.

The inlet guide plate according to the invention thus prevents radiant heat from the gas stream from acting unhindered on the inlet and outlet pipe and through the joint on the fabric compensator. As a result, the gas stream is not so strongly cooled, which reduce crusting due to the sticking together of ash components and other dust particles.

Another, even more important advantage is that the inlet guide plate, for the most part, keeps ash, dust and other solids from penetrating through the joints between the inlet pipe and the outlet pipe onto the inner side of the fabric compensator.

That is in particular dangerous because the ash components cool and therefore can form a crust within the compensator, which can lead to the destruction thereof on movement of the two pipe sockets with respect to one another, and the resulting movement of the fabric compensator.

In one embodiment, the penetration of ash through the joint between the inlet guide plate and the first pipe socket is reduced by a nozzle, which is disposed in the outlet opening of the first pipe socket. Within this nozzle, the inner radius of the first pipe socket tapers, so that at the outlet of the socket the flow velocity of the gas is increased and thereby a subatmospheric pressure occurs in the gap between the nozzle and the inlet guide plate. This subatmospheric pressure counteracts the penetration of foreign bodies into the hollow chamber between the guide plate and the two pipes.

If small solid bodies and particles from the dust contained in the flue gas and the entrained ash have penetrated into the dead spaces, then they adhere particularly strongly to the walls of these dead spaces if they are electrostatically charged. This electrostatic charging falls as a result of the intensive and multiple contact of the particles with one another and with the walls of the pipe socket. For dissipating this electrostatic charge, good earthing of all particles that may come into contact with the particles is very effective. The electrical earthing must therefore have a lowest possible electrical resistance, that is to say must take place over the greatest possible conductor cross-sections. One possibility for earthing are separate earthing cables for each component. A common earthing cable may also be laid from component to component. Other metal earthing connections are also suitable, provided they have a low electrical resistance in the material and at the connecting points.

As a variant for further improvement of the insulation capability of the compensator, insulating materials can be introduced between the inlet guide plate and the two pipes, which must naturally withstand the maximum temperatures prevailing there.

It is just as practical to provide a heat insulator between the fabric compensator and the outer walls of the inlet pipe and outlet pipe.

The additional insulation material, however, cannot prevent hot gas penetrating through the joints between the inlet guide plate and the two pipe socket, and thereby solid particles also penetrating into the space between the inlet guide plate and the inlet and outlet pipe. For protection of the joint between the first pipe socket and the inlet guide plate, the invention proposes an optional nozzle.

To this end, there is disposed, on the outlet opening of the first pipe socket, a ring, the interior diameter of which at the inlet end corresponds to the diameter of the first pipe socket and then tapers to a nozzle in that the internal diameter further reduces towards the outlet.

The protective effect of such a nozzle is so good that no other protective measures are proposed in the region of the joint at the inlet side.

Without further protective measures, in the region, the inlet guide plate can be connected via a plurality of radially extending bridges to the inlet pipe. As connection, it is sufficient that the inlet guide plate lies thereon, for example with a collar and/or a shoulder. The advantage of this relatively loose connection is that relative movements are possible between the inlet guide plate and the bridges.

As an option, an additional support of the inlet guide plate in the region of the centre of the compensator is proposed, where an inlet ring is fastened on the inside of the inlet pipe, and in the profile of the compensator the distance from the outwardly disposed inlet pipe to the inwardly disposed inlet guide plate is for the most part bridged.

In addition to, or alternatively, the inlet guide plate can also be connected to this inlet ring, which is disposed on that side of the inlet guide plate that is more remote from the first pipe socket. Here, too, an appropriate alternative is that the inlet guide plate only lies on the inlet ring with a shoulder, a retaining angle or another similar continuation, because it is then relatively moveable with respect to the inlet ring.

To make the interior space between the inlet pipe and outlet pipe on the exterior side and the inlet guide plate on the interior side as large as possible, the invention prefers that the inlet pipe is fastened on the exterior surface of the first pipe socket and that the outlet pipe is connected to the outer surface of the second pipe socket. The exterior surface of the pipe socket thus also corresponds approximately to the exterior surface of the compensator. Only the additional fabric compensator projects beyond this line.

To also additionally protect the joint between the inlet guide plate and the second pipe socket against the penetration of solids from the gas, the invention proposes, as a further advantageous embodiment, fastening a hollow cylindrical outlet guide plate to the outlet pipe. An outlet ring bridges the distance from the outlet pipe to the interior surface of the second pipe socket.

The inner surface of this outlet guide plate ought to overlap the inlet opening of the second pipe socket in the axial direction of the compensator and therein always only assume a very low distance from the second pipe socket. To this end, the radius of the outlet guide plate must remain constant independently of its operating temperature. For this, the invention proposes that the outlet guide plate comprise contiguous or overlapping hollow cylindrical segments. To compensate thermally related length changes, either the joint between the individual segments or mutually overlapping segments slide further over one another or are drawn down by the adjacent segment by a corresponding portion, so that the radius of the entire outlet guide plate is not changed.

In the design, the radius of this hollow cylindrical outlet guide plate must be chosen so much greater than the radius of the inlet guide plate that it can only cover the inlet guide plate in the longitudinal direction of the compensator by a portion and still, in the case of movements of the two pipe sockets transverse to their longitudinal axis, does not impact against the inlet guide plate. The outlet guide plate is—as mentioned—fastened to the outlet pipe via an outlet ring. The outlet ring thus bridges the distance between the outlet guide plate and the outlet pipe.

The principal advantage of this additional outlet guide plate is that, irrespective of the axial distance between the two pipe sockets, the joint between the inlet guide plate and the second pipe socket is always sealed in the radial direction by the overlapping outlet guide plate, as a result of which the penetration of solids into the annular hollow space of the compensator is further retarded. A further advantage is that the heat of the gas stream is thereby also kept back.

To further reduce the penetration of solids from the smoke-laden dust, the invention propose that the relative size—internal diameter of the second pipe socket, starting from its inlet opening, tapers continually until it is reduced approximately to the radius of the inlet guide plate. As a result of this cone, a turbulence-free transition of the stream is achieved which—in a similar way to the nozzle in the inlet region—also further reduces the risk of penetration of foreign bodies for the gap between the inlet guide plate and the outlet guide plate.

To seal the joint between the inlet guide plate and the second pipe socket in the axial direction, too, as far as possible, in an alternative embodiment the inlet guide plate and the outlet guide plate can be connected to one another by means of a floating coupling guide plate. This coupling guide plate is displaceable with respect to one of the two guide plates in the longitudinal direction of the compensator and with respect to the other guide plate in the transverse direction of the compensator. By this means the path of solid bodies between the inlet guide plate and the first pipe socket, through along the inner wall of the outlet guide plate, is stopped, irrespective of the position in which the two pipe sockets are located with respect to one another.

Another advantage is that the heat radiation outwardly is to the greatest extent blocked and thereby the gas is only very slightly cooled.

As a further embodiment, the invention proposes that, in the—approximately radially extending—inlet ring, a protrusion surrounding it by 360 degrees is formed. This protrusion projects into a recess of the adjacent outlet ring, the profile of this recess being formed so as to be approximately complementary to the profile of the protrusion, however enlarged by the distance that is determined by the maximum movements of the two pipe sockets with respect to one another. As a result, two further walls are constructed as resistance to thermal radiation from the hot gas, which counteracts a cooling of the gas stream.

Nevertheless, the interior space between the inlet guide plate on one side and the inlet and outlet pipe, on the other side, cannot be sealed absolutely hermetically, since the two pipe sockets can move with respect to one another and therefore must also deform the compensator. It is therefore not to be entirely ruled out that solid bodies from the gas penetrate into these hollow spaces. Since in principle, however, relatively little material moves therein, they are also called "dead spaces". Such a space forms between the first pipe socket, the inlet pipe, the inlet ring and the inlet guide plate.

Another dead space is generated by the combination of the second pipe socket with the outlet pipe, the outlet ring and the outlet guide plate. A third hollow space is formed approximately in the centre of the compensator profile between the fabric compensator, the inlet ring, the outlet ring and the coupling guide plate. If at least one of these hollow spaces is subject to barrier air, which is supplied via a pipe from the outside, foreign bodies penetrating through it are opposed by a further resistance.

In an extension of this arrangement, another pipe can be connected to the dead spaces, which is connected to a suction device. By this means foreign bodies that, despite all measures, have still entered the dead spaces can be sucked out continually or at intervals.

For an improvement of the effect of the compensator, it is appropriate that the pipe and/or the rings and/or the guide plates are lined with insulating material on the faces facing the dead spaces. The complementary space to the dead spaces is to be filled with insulation. By this means, the heat losses of the flue gas are reduced across the compensator, which—as mentioned above—is very advantageous since, in this manner, the cooling ash and slag components of a flue gas hardly form lumps.

Another further variant that retards the adhesion of small solid bodies to the surfaces of the compensator is that the pipes, the rings and the guide plates are made of electrically conductive material and are electrically conductively connected. By this means, the electrostatic charge of the guide plates is avoided, which otherwise noticeably increases the adhesion effect of the solid components of the gas.

In a further alternative embodiment, the inlet pipe and the outlet pipe—in addition to the fabric compensator—are additionally connected to one another by means of a flexible sealing element, which is disposed within the fabric compensator. Surrounded by the inlet pipe and the flexible sealing element and the outlet pipe and the fabric compensator, a pressure chamber is thus created, which can be placed under permanent superatmospheric pressure via the barrier-air connection. The fabric compensator is thereby decoupled from the pulsations in the contiguous dead space between the inlet ring and the outlet ring. The pulsations are thereby prevented from acting directly on the fabric compensator and setting it into a "fluttering" movement, which would result in rapid wear.

Instead, the pulsations are restricted as a breathing on the inner dead space between the inlet ring and outlet ring. Thus, two barrier-air circuits are formed, of which the innermost between the inlet ring and outlet ring breathes and the outermost is essentially subject to a constant pressure.

Both barrier-air circuits are accessible from outside via connections and can thus be supplied with barrier air.

For the application case of a compensator, in which the outlet pipe is principally movable only in the axial direction against the inlet pipe, the flexible sealing element only needs to be fastened on the inlet pipe or the outlet pipe, and then lies on the respective other pipe with a lip or similar.

BRIEF DESCRIPTION OF THE DRAWING

Further details and features of the invention are explained below in greater detail with reference to three examples. However, they are not intended to limit the invention but only explain it. In schematic view.

DETAILED DESCRIPTION

Figure 1:
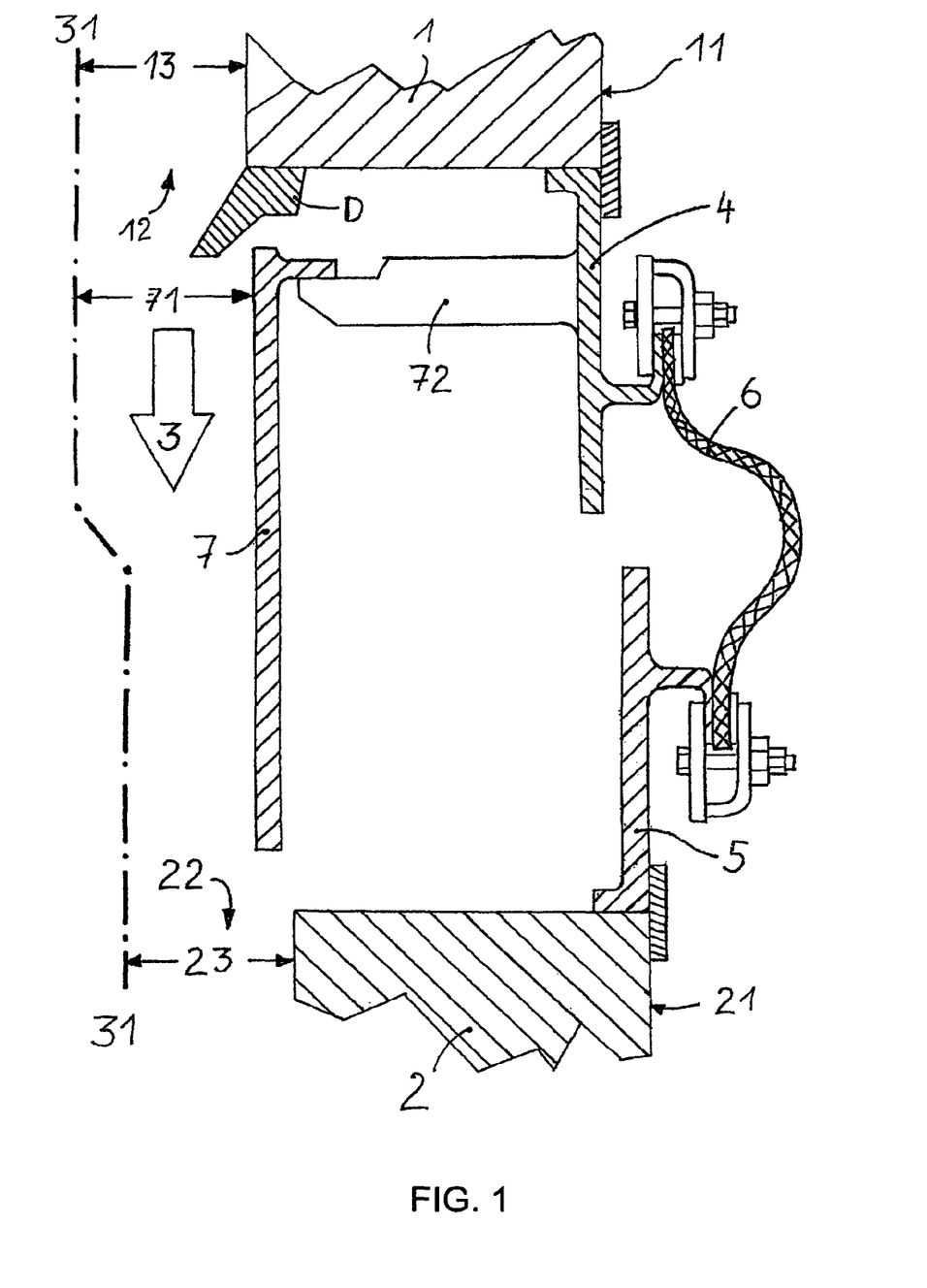
FIG. 1 shows the profile of the compensator in the simplest embodiment
Figure 2:
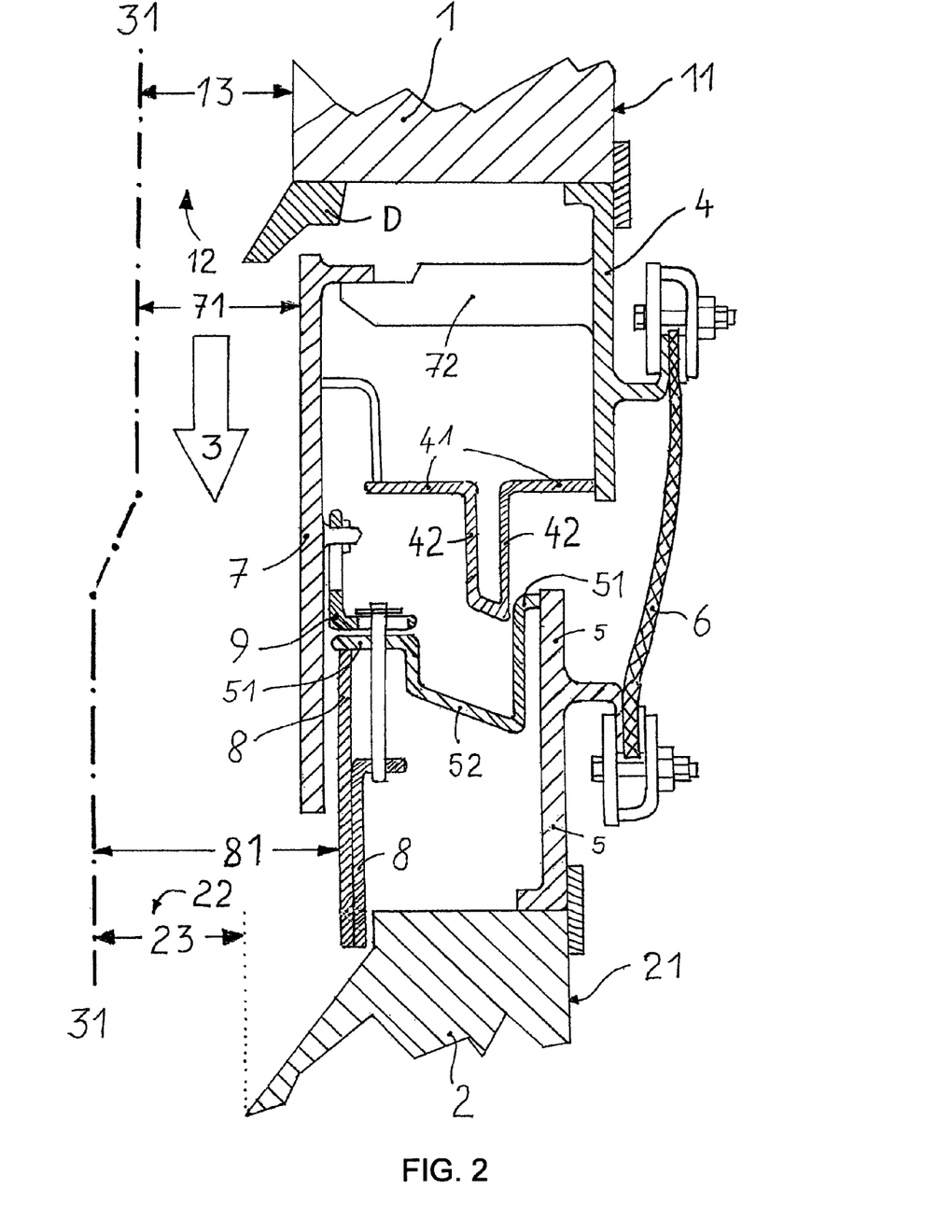
FIG. 2 shows the profile of the compensator with outlet guide plate, rings and coupling guide plate
Figure 3:
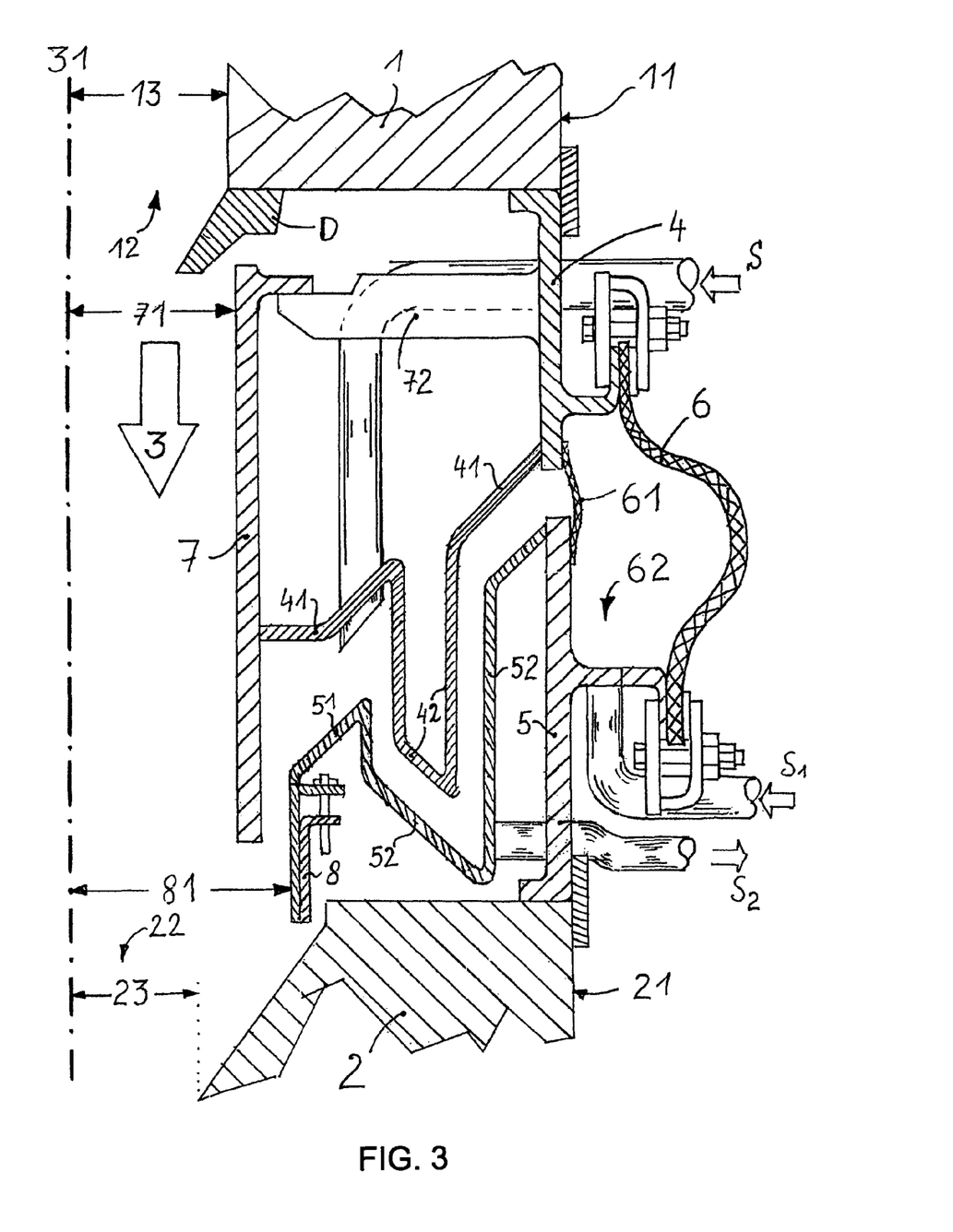
FIG. 3 shows the profile with inlet and outlet ring inclined with respect to the longitudinal axis and the supply of barrier air

The FIGS. 1-3 show the profile of a compensator according to the invention, specifically with the right half of a second along the longitudinal axis. All the hatched surfaces designate a section through an annular portion in each case. All profiles are self-contained, that is to say encircle the longitudinal axis 31 to the extent of a full 360 degrees. In FIGS. 1 to 2, this longitudinal axis 31—also termed "longitudinal direction 31"—is doubly inflected in its profile, as a result of which it is illustrated by what dimension the second pipe socket 2—shown below in the Figures—is offset with respect to the first pipe socket 1—shown at the top in the drawings.

In FIG. 3, the longitudinal axis 31 is drawn as a continuous line, because in the illustrated operating state of the third exemplary embodiment, the first pipe socket 1 is axially aligned with the second pipe socket 2.

In FIG. 1, in the drawing, the second pipe socket 2 is offset to the right and downward with respect to the first pipe socket 1. The two exterior surfaces 11 and 21 of the first and second pipe sockets 1, 2 are therefore not aligned with one another. In the axial direction, the maximum possible distance of the two pipe sockets has still not yet been reached, for which reason the profile of the textile fabric compensator 6 is still additionally wrinkled.

In FIG. 1, the most general case of the invention is illustrated. Here, on the outlet opening 12 of the first pipe socket 1, the nozzle D is fastened. In FIG. 1, it very quickly becomes clear that, in nozzle D, the inner radius 13 of the first pipe socket 1 is reduced. As with a venturi nozzle, the flow velocity in this region is thereby increased and a subatmospheric pressure occurs between the nozzle D and the adjacent inlet guide plate 7. This subatmospheric pressure prevents flue gas and solid bodies contained therein from penetrating into the hollow space between the inlet guide plate 7 and inlet pipe 4 as a result of the—unavoidable—gap between the inlet guide plate 7 and the nozzle D.

The inlet guide plate is fastened on the inlet pipe 4 via a plurality of bridges 72, which are in each case radially oriented. In FIG. 1, it can be easily understood that the inlet guide plate 7 can be displaced in a radial direction with respect to each bridge 72.

FIG. 1 shows that each of the two pipe sockets 1, 2 bears on its exterior surface 11, 21 the inlet pipe 4 and the outlet pipe 5 that is adjacent thereto. The outer surface 11 of the first pipe socket 1 is aligned with the outer surface of the inlet pipe 4 and the outer surface 21 of the second pipe socket 2 is aligned with the outer surface of the outlet pipe 5.

Approximately in the centre of the figure, it can be seen that the outer surface of the outlet pipe 5 is distanced from the outer surface of the inlet pipe 4 in a radial direction. This distance occurs as a result of the required movement of the pipe socket 2 with respect to the first pipe socket 1. The joint formed thereby is covered by the permanently flexible fabric compensator 6, which is fastened by means of a plurality of clamps on a surrounding, L-shaped flange on the inlet pipe 4 and on the outlet pipe 5.

The resistance to solid bodies that press directly on the flexible fabric compensator, however, is very limited. A permanent exposure to very high temperatures, such as those possessed by the through-flowing gas 3, also takes its toll on the lifetime of the flexible fabric compensator.

In FIG. 1, it is made clear that in the illustrated, simplest version, despite the shielding inlet guide plate 7, solid bodies can nevertheless pass through the gap between the inlet guide plate 7 and the second pipe socket 2 and can settle in the fabric compensator through the gap between the inlet pipe 4 and the outlet pipe 5.

Such contamination would be extremely disadvantageous for two reasons: First, the hard ash particles very rapidly damage the fabric compensator, second the ash components and other solid bodies within the fabric compensator very rapidly cool down, since the latter cannot provide extensive thermal protection. By means of this cooling, the ash components clump together and form even larger solid bodies, which can very probably damage the flexible fabric compensator.

To avoid these disadvantages, the inventions propose additional embodiments, which are illustrated in FIGS. 2 and 3.

FIG. 2 shows the same cross-section as in FIG. 1, but with additional fittings in in an operating state in which the second pipe socket 2 departs to the left with respect to the first pipe socket 1, which is also made clear in FIG. 1 by the altered "bend" of the longitudinal axis 31. The altered operating state is also recognisable by the changed form of the fabric compensator 6.

In FIG. 2, the inlet ring 41 in the inlet pipe 4 is shown as an additional embodiment. It bridges the distance between the outer lying inlet pipe 4 and the inner lying inlet guide plate 7 and in this version further seals the inlet guide plate 7. Furthermore, the function of the inlet ring 41 consists in protecting the insulation and delimiting the dead space. It is not considered as an essential function of the inlet ring 41 to support the inlet guide plate 7.

In the inlet ring 41, a protrusion 42 is introduced, which projects into a recess 52 on the outlet ring 51, which recess is complementary to the protrusion but enlarged by a specific distance. In FIG. 2, it can be seen that this recess 52 is so much bigger than the silhouette of the protrusion 42 that the protrusion 42 is, in all movement states of the second pipe socket 2, movable with respect to the first pipe socket 1 within the recess 52.

As a further embodiment, FIG. 2 shows the outlet guide plate 8 between the inlet guide plate 7 and the second pipe socket 2. In FIG. 2, it can be readily seen that the outlet guide plate 8 is multipart, since it consists of a plurality of segmented hollow cylinders, which always complement one another independently of their temperature and thereby independently of their expansion, to form a ring of constant radius. In the embodiment shown in FIG. 2, these segments are connected to the outlet ring 51, which is fastened on the outlet pipe 5. It thereby becomes possible to position the outlet guide plate 8 directly on the inner edge of the second pipe socket 2.

The embodiment in FIG. 2 shows a conical tapering of the inlet opening 22, which simultaneously merges into the outlet guide plate 8. At the edge between the outlet guide plate 8 and the second pipe socket 2, excessive turbulence is thereby avoided and the risk thereby reduced of a multiplicity of further solid particles being forced into the gap between the outlet guide plate 8 and inlet guide plate 7.

In FIG. 3, another development of the most general form shown in FIG. 1 of a compensator according to the invention is shown.

In this variant, the planes of the inlet ring 41 and of the outlet ring 51 are inclined with respect to the longitudinal axis 31 of the compensator. With a vertical design of the compensator, foreign bodies on the lower region of the outlet ring 51 can thereby fall back into the second pipe socket 2 by force of gravity.

In FIG. 3, a barrier air system with double air chambers is shown. The inner air chamber forms in the dead space between the inlet guide plate 7, the inlet ring 41 with the protrusion 42 disposed thereon and the outlet ring with the recess 52 disposed thereon. This inner air chamber, in the embodiment according to FIG. 3, is closed outwardly by means of a flexible sealing element 61, which keeps pulsations in the inner air chamber away from the outer air chamber, the pressure chamber 62, or at least strongly dampens them.

The inner air chamber can be subject to barrier air by means of the barrier air connections S and S1, which prevents the foreign bodies and particles from penetrating. It also keeps back the flue gases from penetrating into the dead space, where they might cool and thereby form a crust.

In FIG. 3, a second operating state of the barrier air concept in the inner air chamber is also illustrated. If, with a vertical arrangement of the compensator, foreign particles that have penetrated into the recess 52 of the outlet ring remain there and thereby restrict the mobility of the recess 52 with respect to the protrusion 42, or block it, barrier air can be supplied via the upper barrier air connection S and air sucked out of the lower barrier air connection S2. In the process, foreign bodies that have settled in the protrusion 52 are entrained by the air stream and conveyed to the outside.

In the embodiment according to FIG. 3, by means of the flexible sealing element, the inlet pipe, the outlet pipe and the fabric compensator, a further air chamber, the pressure chamber 62, is created. It can be set under permanent superatmospheric pressure by virtue of the barrier-air connection S1. In FIG. 3, it is very readily understandable that the fabric compensator 6 is thereby decoupled from the pulsations in the adjacent dead space between the inlet ring 41 and the outlet ring 51, and it is thus prevented that the pulsations act directly on the fabric compensator 6, and set it into "fluttering movement", which would result in rapid wear.

Instead, the pulsations remain restricted as a breathing on the inner dead space between the inlet ring 41 and outlet ring 51.

FIG. 3 clearly shows the two barrier air circuits separated from one another by the flexible sealing element 61, of which the inner one breathes between the inlet ring 41 and outlet ring 51 and the outer one, the pressure chamber 62, is subject essentially to a constant pressure.

List of Reference Characters

1 First pipe socket, admits the gas 3
11 Outer surface of the first pipe socket 1
12 Outlet opening of the first pipe socket 1
13 Inner radius of the first pipe socket 1
2 Second pipe socket, takes up the gas 3
21 Outer surface of the second pipe socket 2
22 Inlet opening of the second pipe socket 2
23 Inner radius of the second pipe socket
3 Gas streams from the first pipe socket 1 through the inlet pipe 4 and the outlet pipe 5 into the second pipe socket 2
31 Longitudinal direction of the compensator, corresponds to the longitudinal axis and the flow direction of the gas 3
4 Inlet pipe between the first pipe socket 1 and the outlet pipe 5
41 Inlet ring, in inlet pipe 4
42 Protrusion, surrounding on the inlet ring 41
5 Outlet pipe, between the inlet pipe 4 and the second pipe socket 2
51 Outlet ring, in the outlet pipe 5
52 Protrusion, surrounding in the outlet ring 51
6 Fabric compensator, connects inlet pipe 4 to the outlet pipe 5
61 Flexible sealing element, between the inlet pipe 4 and the outlet pipe 5
62 Pressure chamber, between the fabric compensator 6 and the flexible sealing element 61
7 Inlet guide plate, within the inlet pipe 4, connecting with the pipe socket 1
71 Radius of the inlet guide plate 7
72 Bridge, holds the inlet guide plate 7
8 Outlet guide plate, between the inlet guide plate 7 and the outlet ring 5
81 Radius of the outlet guide plate 8
9 Coupling guide plate, connects the inlet guide plate 7 and outlet guide plate 8
D Nozzle in the outlet opening 12 of the first pipe socket 1
S Connection for barrier air
S1 Connection for pressurizing the pressure chamber 62
S2 Second connection for barrier air for pressurization or draining of the inner dead space between the inlet ring 41 and outlet ring 51

The invention claimed is:

1. Compensator for connecting a first pipe socket to a second pipe socket, which is spaced from the former and movable with respect thereto, comprising:
an inlet pipe, which is coaxially fixed on an outlet opening of the first pipe socket;
an outlet pipe,
which is arranged approximately coaxially to the inlet pipe, is spaced therefrom, and
is coaxially fixed on an inlet opening of the second pipe socket; and
a fabric compensator, which connects the inlet pipe and outlet pipe to one another;
wherein:
all the aforementioned pipes allow through-flow by dust-laden gas in a direction from the first pipe socket to the second pipe socket, wherein a hollow cylindrical inlet guide plate is fastened to the inlet pipe, close to the first pipe socket, of which a radius of the inlet guide plate approximately corresponds to an inner radius of the first pipe socket;
the hollow cylindrical inlet guide plate is connected to a plurality of radially extending guide plates in a vicinity of the first pipe socket and to a surrounding inlet ring remote from the first pipe socket;
the radially extending guide plates and the surrounding inlet ring are fastened to the inlet pipe;
an outlet guide plate is fastened via an outlet ring on the outlet pipe;
a surrounding protrusion is formed into the inlet ring and projects into a surrounding recess on the outlet ring; and
a profile of said recess is formed so as to be approximately complementary to a profile of the protrusion, and is enlarged by a movement distance, which is determined by mutual movements of the first and second pipe sockets with respect to one another.

2. Compensator according to claim 1, wherein the inlet guide plate is connected to the inlet ring in that the inlet guide plate lies thereon via a collar and/or a shoulder, wherein relative movements between the inlet guide plate and the radially extending guide plates and/or the inlet ring are possible.

3. Compensator according to claim 1, further comprising a nozzle disposed on the outlet opening of the first pipe socket, wherein the inner radius of the first pipe socket is tapered within the nozzle.

4. Compensator according to claim 3, wherein an internal diameter of the second pipe socket-starting at its inlet opening-continually narrows to the extent that the internal diameter is reduced approximately to the radius of the inlet guide plate.

5. Compensator according to claim 1, wherein a length of the hollow cylindrical inlet guide plate does not exceed a sum of lengths of the inlet pipe and of the outlet pipe.

6. Compensator according to claim 1, wherein
the inlet pipe is fastened on an outer surface of the first pipe socket and/or
the outlet pipe is connected to an outer surface of the second pipe socket.

7. Compensator according to claim 1, wherein the outlet guide plate comprises:
contiguous or mutually overlapping hollow cylindrical segments; a radius of the outlet guide plate is greater than the radius of the inlet guide plate; and
the outlet guide plate partially covers the inlet guide plate in a longitudinal direction,
wherein the outlet guide plate merges into the inlet opening of the second pipe socket, and in the process, at least one of the hollow cylindrical segments partially overlaps the second pipe socket in the axial direction.

8. Compensator according to claim 1, wherein the inlet guide plate and the outlet guide plate are connected to one another via a floating coupling guide plate, which can be displaced in a longitudinal direction of the compensator with respect to one of the inlet and outlet guide plates and which can be displaced in a transverse direction of the compensator with respect to the other of the inlet and outlet guide plates.

9. Compensator according to claim 1, wherein dead spaces that are formed between the inlet ring, the first pipe socket, the inlet guide plate and the inlet pipe, and between the outlet ring, the outlet guide plate, the outlet pipe and the second pipe socket are lined with insulation material.

10. Compensator according to claim 9, wherein at least one of the dead spaces that are formed between the first pipe socket, the inlet pipe, the inlet ring and the inlet guide plate, and between the second pipe socket, the outlet pipe, the outlet ring and the outlet guide plate as well as between the fabric compensator, the inlet ring, the outlet ring and a coupling guide plate are permanently or intermittently subject to barrier air.

11. Compensator according to claim 9, wherein at least one of the dead spaces is connected via a pipe connection to a suction.

12. Compensator according to claim 9, wherein faces of the pipes, the rings with the protrusion and the recess, and/or the guide plates that face the dead spaces are lined with insulation material.

13. Compensator according to claim 1, wherein least one of the inlet and outlet pipes, the inlet and outlet rings with the protrusion and the recess, and the inlet and outlet guide plates, are made of electrically conductive material and are configured to be electrically conductively connected to an earthing connection via one of separate earthing cables, and a common earthing cable.

14. Compensator according to claim 13, wherein the earthing is an electrically conductive connection to at least one of an outer surface of the first pipe socket and an outer surface of the second pipe socket.

15. Compensator according to claim 1, wherein the inlet pipe and the outlet pipe are connected together by means of a flexible sealing element, which is disposed within the fabric compensator, and the inlet pipe and the flexible sealing element and the outlet pipe and the fabric compensator delimit a pressure chamber, which can be set under permanent superatmospheric pressure by means of a barrier-air connection.

16. Compensator according to claim 15, wherein the outlet pipe is configured to move in an axial direction with respect to the inlet pipe, and the flexible sealing element is only fastened on the inlet pipe or the outlet pipe and lies via a lip on the other pipe in each case.

* * * * *